United States Patent [19]

Quaglino, Jr.

[11] Patent Number: 4,672,921
[45] Date of Patent: Jun. 16, 1987

[54] COMPRESSION RETAINING PISTON

[76] Inventor: Angelo V. Quaglino, Jr., 3220 Palmisano Blvd., Chalmette, La. 70043

[21] Appl. No.: 806,648

[22] Filed: Dec. 9, 1985

Related U.S. Application Data

[63] Continuation of Ser. No. 599,231, Apr. 11, 1984, abandoned.

[51] Int. Cl.⁴ ................................................ F01P 3/10
[52] U.S. Cl. ................................. 123/41.38; 92/157
[58] Field of Search .............. 123/41.35, 41.37, 41.38, 123/41.39, 196 S, 198 D; 92/157-160

[56] References Cited

U.S. PATENT DOCUMENTS

| | | | |
|---|---|---|---|
| 878,783 | 2/1908 | Downie | 92/159 |
| 2,741,519 | 4/1956 | Meurer | 123/41.37 |
| 2,757,656 | 8/1956 | Stegemann | 123/196 S |
| 3,058,792 | 10/1962 | Elford et al. | 92/159 |
| 3,782,357 | 1/1974 | Kuhn et al. | 123/196 S |
| 3,841,291 | 10/1974 | Ludewig et al. | 123/196 S |
| 4,050,360 | 9/1977 | Powers et al. | 92/160 |

FOREIGN PATENT DOCUMENTS 887788 1/1962 United Kingdom ............ 123/196 S Primary Examiner—William A. Cuchlinski, Jr.
Attorney, Agent, or Firm—Pravel, Gambrell, Hewitt & Kimball

[57] ABSTRACT

A piston with a centrally located recessed area around the outer wall for containing oil on a continuous basis during engine operation. The recessed area is provided with apertures in fluid communication with passageways in the wrist pin, connecting rod, and crank shaft. An oil pump directs oil or lubricant through the passageways to the recessed area during engine operation for lubrication and prevention of compression loss. A heat resistent elastomeric oil ring is provided on the side wall of the piston above the recessed area for prevention of oil flow upwards toward the head of the piston.

4 Claims, 4 Drawing Figures

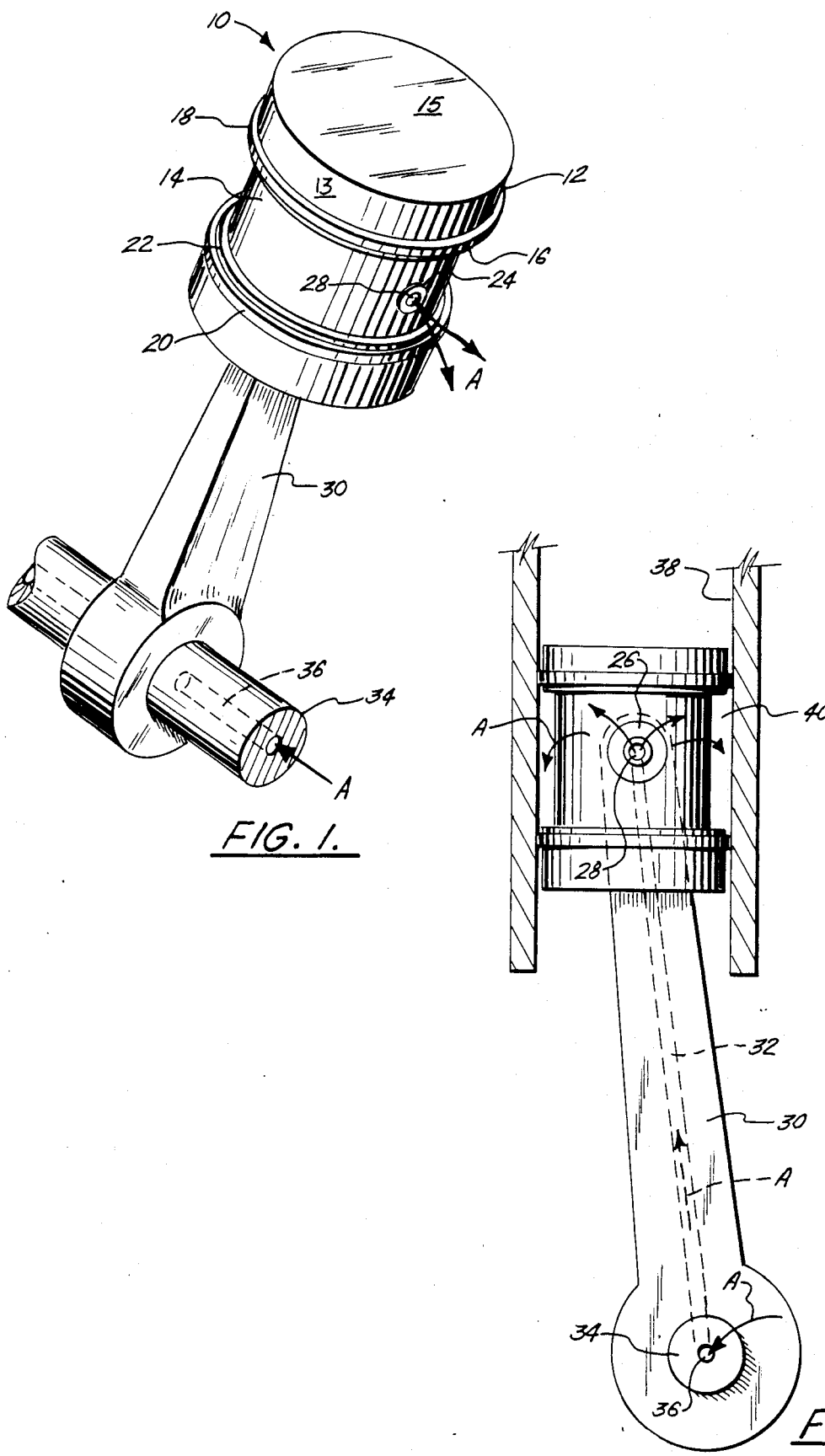

COMPRESSION RETAINING PISTON

This is a continuation, of application Ser. No.: 599,231 Filed Apr. 11, 1984, by the same inventor, now abandoned.

BACKGROUND OF THE INVENTION

1. Field of the Invention

The present invention relates to internal combustion engine pistons and more particularly relates to pistons which lubricate as well as maintain compression within the engine.

2. General Background of the Invention

In the field of combustion engines, pistons are normally provided with a pair of compression rings around the outer portion of the piston and substantially near the top thereof for maintaining compression within the cylinder by continued contact of the compression rings with the cylinder wall. However, pistons have not been utilized which lubricate the cylinder wall and maintain compression within the cylinder at the same time. A variety of lubricating devices are disclosed in the art which utilize pistons and lubricants in combination but do not disclose use of the lubricant as a means for retaining compression in the cylinder with the piston.

U.S. Pat. No. 415,097, issued to F. Devlin, entitled "Piston Packing," illustrates a lubricating bore through the piston rod and a lateral bore through the piston head to provide lubrication in the area of the piston head. The object of the invention is to carry water or other lubricant between two sets of rings in a metallic steam packing.

U.S. Pat. No. 648,153, issued to J. P. Serve, entitled "Means For Lubricating Engine Cylinders," teaches the use of a bore within the piston rod up to the piston head with the lubricant exiting in the body of the piston against the wall of the cylidner. This invention is utilized for lubrication and also provides a means for draining off the excess lubricant which may accumulate.

U.S. Pat. No. 2,188,105, issued to W. T. Caldwell, entitled "Lubricating Mechanism For Reciprocating Pumps And Similar Devices," shows the use of a bore within the piston rod which communicates with a lateral bore in the piston for lubricating the space between the piston and the cylinder wall. This invention addresses the problem of lubrication and preventing debris from getting between the piston and the cylinder wall but is used as a pump and not as a cylinder would be used in an internal combustion engine for maintaining compression.

U.S. Pat. No. 2,268,544, issued to C. J. Coberly, entitled "Lubricated Piston," illustrates the use of a bore within the piston rod and head for providing lubrication between the piston head and the cylinder wall to permit a flow of lubricant to the sliding surfaces of the piston and the liner so as to lubricate them and prevent foreign materials from lodging therebetween.

U.S. Pat. No. 2,748,718, issued to J. W. MacClatchie, entitled "Pump And Piston Combination," teaches the use of a bore within the piston rod communicating with a bore in the piston for lubricating the wall between the piston and the cylinder wall. The patent does not discuss use of the lubricant as a means for retaining compression.

French Pat. No. 998,327, shows the use of lubrication between the piston and wall of the cylinder.

U.S. Pat. Nos. 832,956; 2,295,160; and 2,366,832 are pertinent only in that they teach means of lubrication.

SUMMARY OF THE INVENTION

The present invention solves the above-mentioned problem in a simple and straightforward manner. What is provided is a piston having a centrally located recessed area around the outer wall for containing oil on a continuous basis. The oil pump from the engine pumps oil into the recessed area via a port in the wrist pin in communication with a port in the wall of the recessed area of the piston and a passage in the piston rod and the crank shaft. Heat resistant oil rings are provided around the piston wall above and below the recessed area and expand against the wall of the cylinder to maintain the oil in the recess. The oil in the recessed area serves to lubricate the cylinder wall and piston as well as maintain compression within the cylinder by preventing loss as commonly occurs with normal compression rings and also helps to prevent blow by of gases during engine operation.

In view of the above, it is an object of the invention to provide a piston which may be used to lubricate the cylinder wall and the piston.

It is another object of the invention to provide a piston which prevents compression loss in the cylinder.

It is a further object of the invention to provide a piston which minimizes blow by of gases.

In view of the above objects, it is a feature of the invention to provide a piston having a recessed area around the outer wall for containing lubricant.

It is another feature of the invention to provide a piston having a port in the recessed area in communication with passages in a wrist pin, connecting rod and crank shaft for pumping lubricant into the recessed area.

BRIEF DESCRIPTION OF THE DRAWINGS

For a further understanding of the nature and objects of the present invention, reference should be had to the following detailed description, taken in conjunction with the accompanying drawings, in which like parts are given like reference numerals and, wherein:

FIG. 1 is a perspective view illustrating the invention connected to a crank shaft.

FIG. 2 is a sectional view of the invention within a cylinder.

DETAILED DESCRIPTION OF THE INVENTION

Figure 3:
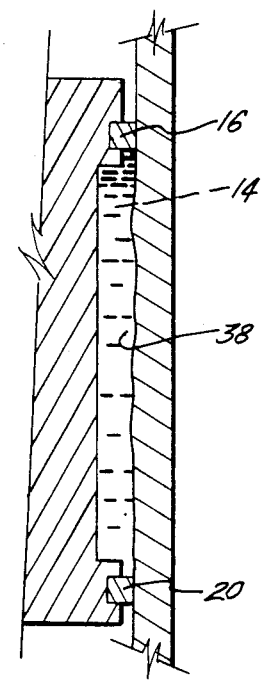
FIG. 3 is a view which illustrates that the lubricant fills in any irrregular spaces on the cylinder wall.

Referring now to the drawings, it is seen that the piston apparatus is generally referred to by the numeral 10. As seen in FIG. 1, apparatus 10 is generally comprised of cylindrical body portion 12, recessed area 14 around the circumference of body portion 12, upper oil ring 16 and lower oil ring 20.

As seen in FIG. 1, cylindrical body portion 12 is in the general shape of a conventional piston used in an internal combustion engine having a continuous side wall 13 and head 15 defining a longitudinal recess in body portion 12. Cylindrical body portion 12 differs from a conventional piston in that continuous side wall 13 is provided with recessed area 14 around the circumference thereof substantially located near the center thereof comprising a substantial portion of side wall 13. Above recessed portion 14 and positioned on side wall 13 is upper oil ring 16 which is fit into recess 13 adapted to receive upper oil ring 16. Below recessed portion 14 on side 13 is lower oil ring 20 which is positioned in recess 22. In the preferred embodiment, oil rings 16 and 20 are constructed of a resilient elastomeric material or an equivalent ring of the type manufactured under the trade name "viton" which is heat resistent so as to withstand the extreme heat caused by combustion and friction normally generated within an internal combustion engine.

Provided in recessed area 14 are diametrically opposed ports 24, only one of which is shown, for receiving and directing oil or lubricant as indicated by ARROWS A between recessed portion 14 and cylinder wall 38. Apertures 24 are sized to receive the ends of wrist pin 26 and maintain piston 10 on wrist pin 26 in a manner well known.

Wrist pin 26 is provided with passage 28 in the interior thereof for the passage of lubricant or oil through wrist pin 26 and into the space between recessed portion 14 and cylinder wall 38.

Connecting rod 30 is pivotally connected at its upper end, as seen in FIG. 2 to wrist pin 26. Connecting rod 30 likewise is provided with passage 32 therethrough for the passage of oil or lubricant as indicated by ARROWS A in FIG. 2 into passage 28 in wrist pin 26. Connector rod 30 and wrist pin 26 are rotatably engaged with each other in a manner well known in the art and in such a way to provide fluid communication between passages 28 and 32.

Crank shaft 34 is rotatably engaged to connecting rod 30 at the lower end of connecting end 30. Crank shaft 34 is provided with passage 36 through substantially the center of crank shaft 34 so that passage 36 in crank shaft 34 is in fluid communication with passage 32 in connecting rod 30. This allows passage of oil or lubricant as indicated by the ARROWS through passage 36 in crank shaft 34 into passage 32 in connecting rod 30 then into passage 28 provided in wrist pin 26 and out of passage 28 into space 40 provided between recessed portion 14 and cylinder wall 38.

The source of oil or lubricant may be provided by the normal supply for the internal combustion engine into which apparatus 10 is installed and the source for pumping the lubricant through the passages may be the existing oil pump not shown used in the conventional engine.

The lubricant which is pumped through the passages and into space 40 between recessed portion 14 and cylinder wall 38 serves two main purposes. The lubricant first serves to lubricate the cylinder wall 38 in apparatus 10 as apparatus 10 reciprocates through its normal motion during engine operation. Secondly, the lubricant serves to aid in preventing loss of compression in the cylinder due to the fluid pressure created by the continual pumping of lubricant into space 40. The lubricant in space 40 also minimizes blow by gases flowing past the oil rings 16 and 18 as normally occurs in internal combustion engines using conventional compression rings.

It can be appreciated that apparatus 10 prevents loss of compression in the cylinder in several ways. Oil rings 16 and 18 prevent loss of compression by the fact that they do not have the gaps normally found in conventional compression rings placed on pistons, and the viscosity of the lubricant used also aids in preventing loss of compression. The lubricant, when constantly pumped into space 40 and caused to fill space 40 also conforms to any irregularities in wall 38, as illustrated in FIG. 3, therefore providing a continuous seal along wall 38.

In operation, when the internal combustion engine is started, oil is pumped, either by the normal oil pump from the normal oil source or by a second oil pump and second oil source, through passage 36 in crank shaft 34 into passage 32 located in connecting rod 30 then into passage 28 in wrist pin and out of passage 28 into space 40 between recessed portion 14 and cylinder wall 38. The constant pumping motion provides a constant supply of lubricant in space 40 thereby preventing loss of compression in the cylinder and providing a more efficient running engine. Any lubricant which leaks downwardly along the walls of cylinder 38 is recirculated in the normal fashion back to the conventional oil pump and is recirculated through the system. It can be seen that this pocket of lubrication provided between recessed portion 14 and cylinder wall 38 aids in an efficient running engine due to higher compression, greater lubrication and cooler running. It can also be seen that this increased lubrication should increase engine life and reduce internal engine wear.

Figure 4:
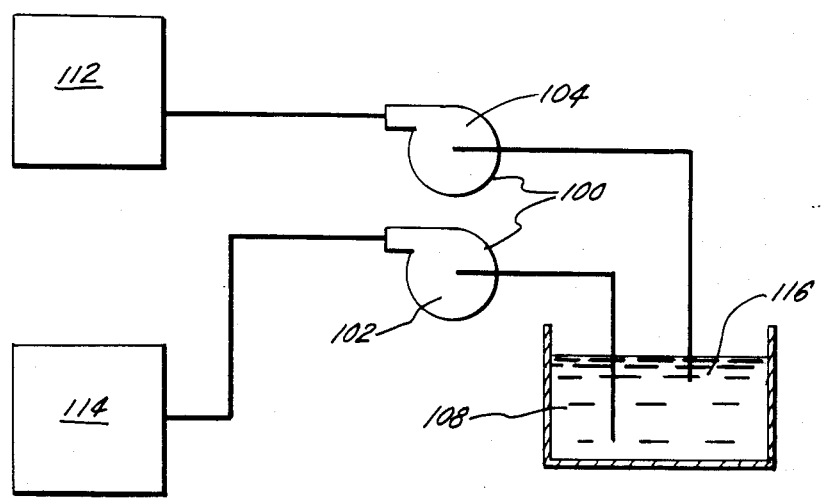
FIG. 4 is a schematic illustrating the use of separate oil pumps for the pistons and remaining engine components.

FIG. 4 illustrates a pumping system 100 for lubricant where separate pumps 102 and 104 are used. Both pumps 102 and 104 draw lubricant oil from the same source, for example, oil pan 108 but at different levels for different purposes. Pump 104, for example would supply oil to the pistons 112, for the maintenance of the compression as was described earlier in the application, and pump 18 supplies oil to the remaining engine components 114. Pump 104 draws oil from a high level 116 in oil pan 108 than pump 102. The reason for this is that if the oil level should fall below the point 116 where pump 104 draws oil from the oil source 108, the pistons 112 will no longer receive the right quantity of oil in order to maintain the compression, and thus the engine will be automatically shut down due to the lack of oil flow. Since the engine would shut down at this loss of oil, this would prevent the occurrence of oil being loss to the remainder of the components 114 prior to the engine shutting down which would cause engine burn out.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in a limiting sense.

What is claimed as invention is:

1. A piston apparatus for maintaining compression between the piston wall and the cylinder wall, comprising:
   a. a generally cylindrical piston body, including:
      i. a head portion defining the forward end of said body; and
      ii. a continuous side wall portion extending rearward from said head portion;
   b. means for lubricating and preventing compression loss between said side wall portion and said cylinder wall, including an annular recessed area in said continuous side wall portion for receiving a quantity of fluid lubricant in fluid engagement between the wall of said recessed and the wall of said cylinder;

c. first and second resilient, elastomeric, heat resistant rings positioned in grooves along the wall of the continuous side wall portion, above and below the annular recessed area, each ring engaging the cylinder wall, to reduce loss of lubricant within the recessed area during operation of the piston;

d. first pump means for providing fluid lubricant to engine components other than the pistons; and e. second pump means for providing fluid lubricant to said recessed area in said continuous side wall portion of said piston, said first and second pump means obtaining lubricant from a common source, and said second pump means including a flow line supplying oil from a predetermined level above the level of oil provided to said first pump means, so that should the oil level to the second pump means fall below the said predetermined level, the loss of oil to said recessed area in said continuous side wall portion of said piston would result in loss of compression and shut down of the engine.

2. The apparatus of claim 1, further comprising a wrist pin engaged in said side wall and further providing fluid lubricant communication between said lubricant supply means and said lubrication means.

3. The apparatus in claim 2, further providing a connecting rod pivotally engaged at the first end to said wrist pin for allowing pivotal movement of said wrist pin engaged in said side wall and further allowing fluid communication from said connecting rod into said wrist pin.

4. The apparatus in claim 3, further providing a crank shaft privotally connected at a second end of said connecting rod and allowing fluid communication from said crank shaft through said connecting rod, said wrist pin into said lubricating means.

* * * * *